(12) United States Patent
Guyon

(10) Patent No.: US 10,981,610 B2
(45) Date of Patent: Apr. 20, 2021

(54) AIR GUIDING DEVICE FOR A MOTOR VEHICLE, COMPRISING A FIXED PART AND A MOVEABLE PART

(71) Applicant: Flex-N-Gate France, Audincourt (FR)

(72) Inventor: Cyrille Guyon, Nommay (FR)

(73) Assignee: Flex-N-Gate France, Audincourt (FR)

( * ) Notice: Subject to any disclaimer, the term of this patent is extended or adjusted under 35 U.S.C. 154(b) by 39 days.

(21) Appl. No.: 16/456,173

(22) Filed: Jun. 28, 2019

(65) Prior Publication Data
US 2020/0001934 A1 Jan. 2, 2020

(30) Foreign Application Priority Data
Jun. 28, 2018 (FR) .................................... 18 55891

(51) Int. Cl.
*B62D 35/00* (2006.01)
*B62D 37/02* (2006.01)
(52) U.S. Cl.
CPC .............. *B62D 35/00* (2013.01); *B62D 37/02* (2013.01)
(58) Field of Classification Search
CPC .... B62D 35/00; B62D 35/001; B62D 35/002; B62D 35/005; B62D 35/006; B62D 35/007; B62D 35/008; B62D 37/02; Y02T 10/82
USPC .............................. 296/180.1–180.5; 180/903
See application file for complete search history.

(56) References Cited

U.S. PATENT DOCUMENTS

| 4,165,118 A | * | 8/1979 | Jensen | B62D 33/0273 |
| | | | | 296/50 |
| 5,486,032 A | * | 1/1996 | Reed | B62D 33/0273 |
| | | | | 296/180.1 |
| 6,520,564 B1 | | 2/2003 | Liang | |
| 2015/0102634 A1 | * | 4/2015 | Bauer | B60J 7/223 |
| | | | | 296/180.1 |

FOREIGN PATENT DOCUMENTS

| DE | 10 2010 037 616 A1 | 3/2012 |
| DE | 10 2016 005 471 A1 | 11/2017 |
| JP | S57-74888 U | 5/1982 |
| WO | 2016/092165 A1 | 5/2016 |

OTHER PUBLICATIONS

US-5486032-A Translation (Year: 1980).*
JPS5774888U-Drawings (Year: 1908).*

* cited by examiner

*Primary Examiner* — Dennis H Pedder
(74) *Attorney, Agent, or Firm* — Troutman Pepper Hamilton Sanders LLP

(57) ABSTRACT

The air guiding device for a motor vehicle, having a fixed part intended to be fixed to the motor vehicle, and at least one moveable part mounted on the fixed part, the moveable part being rotatably moveable relative to the fixed part between a rest position and an extended position, the moveable part comprising a first air guiding surface and a second air guiding surface, approximately opposite to the first air guiding surface, the first air guiding surface guiding the airflow when the moveable part is in the rest position. The second air guiding surface guides the airflow when the moveable part is in the extended position.

9 Claims, 1 Drawing Sheet

AIR GUIDING DEVICE FOR A MOTOR VEHICLE, COMPRISING A FIXED PART AND A MOVEABLE PART

CROSS REFERENCE

This application claims the benefit of French Patent Application FR 18 55891, filed on Jun. 28, 2018 and hereby incorporated by reference herein.

TECHNICAL FIELD

The present invention relates to an air guiding device for a motor vehicle, comprising:

a fixed part intended to be fastened to the motor vehicle, and at least one moveable part mounted on the fixed part, the moveable part being rotatable relative to the fixed part between a rest position and a deployed position, the moveable part including a first air guiding surface and a second air guiding surface, substantially opposite the first air guiding surface, the first air guiding surface guiding the flow of air when the moveable part occupies the rest position.

BACKGROUND

Document U.S. Pat. No. 6,520,564 for example describes such an air guiding device. Such an air guiding device is for example a spoiler mounted on the motor vehicle intended to guide the flow of air around the guiding device in order to improve the aerodynamic performance of the motor vehicle.

However, such an air guiding arrangement is complex and requires many parts (ball joints, etc.), which makes the system cumbersome and expensive.

SUMMARY

One of the aims of the present invention is therefore to propose an air guiding device improving the high-speed aerodynamic performance by using very simple kinematics, while allowing satisfactory esthetics when stopped or at low speeds. To that end, the invention relates to an air guiding device of the aforementioned type, wherein the second air guiding surface guides the flow of air when the moveable part occupies the deployed position.

By allowing the device to guide the flow of air with each of its surfaces, the device is suitable for improving the aerodynamic performance irrespective of the movement speed of the motor vehicle, while limiting the bulk of the device. When the vehicle is stopped or at a low speed, it has an attractive esthetic, the aerodynamic performance not being very important. At a high speed, the air guiding is deployed, allowing a gain in terms of stability and drag.

According to specific embodiments of the invention, the air guiding device further has one or more of the following features, considered alone or according to any possible combination(s):

when the moveable part occupies the rest position, the second air guiding surface extends opposite the fixed part and the first air guiding surface faces the outside of the motor vehicle, and when the moveable part occupies the deployed position, the second air guiding surface faces the outside of the motor vehicle;

the fixed part comprises an air guiding surface and a housing configured to receive the moveable part such that, when the moveable part occupies the rest position, the first guiding surface of the moveable part extends substantially in the continuation of the air guiding surface of the fixed part;

the rotation angle of the moveable part between the rest position and the deployed position is greater than 30°;

the air guiding device further includes a return spring constraining the moveable part toward the rest position;

the air guiding device further includes a position blocking device and/or a position unblocking device of the moveable part;

the position blocking device is an actuator; and the unblocking device is an impulse system.

The invention also relates to a motor vehicle including an air guiding device in which the rotation of the moveable part from the rest position toward the deployed position is done under the effect of a flow of air around the motor vehicle when said motor vehicle moves.

According to specific embodiments of the invention, the motor vehicle further has the following feature:

the moveable part rotates from the rest position toward the deployed position when the speed of the motor vehicle is greater than 60 km/h, and the moveable part rotates from the deployed position toward the rest position when the speed of the motor vehicle is less than 40 km/h.

BRIEF DESCRIPTION OF THE DRAWINGS

Other features and advantages of the invention will appear upon reading the following description, provided solely as an example and done in reference to the appended drawings, in which.

DETAILED DESCRIPTION

In the description, the terms "lower", "upper", "transverse", "front", "rear" are defined in the usual directions of an assembled vehicle, these terms referring, if applicable, to the position of the air guiding device when it is assembled on the vehicle. The transverse direction refers to a direction that extends substantially perpendicular to the movement direction of the vehicle. The term "inner" refers to what faces the body of the vehicle and the term "outer" to what faces the outside of the vehicle when the air guiding device is assembled on the vehicle.

Figure 1:
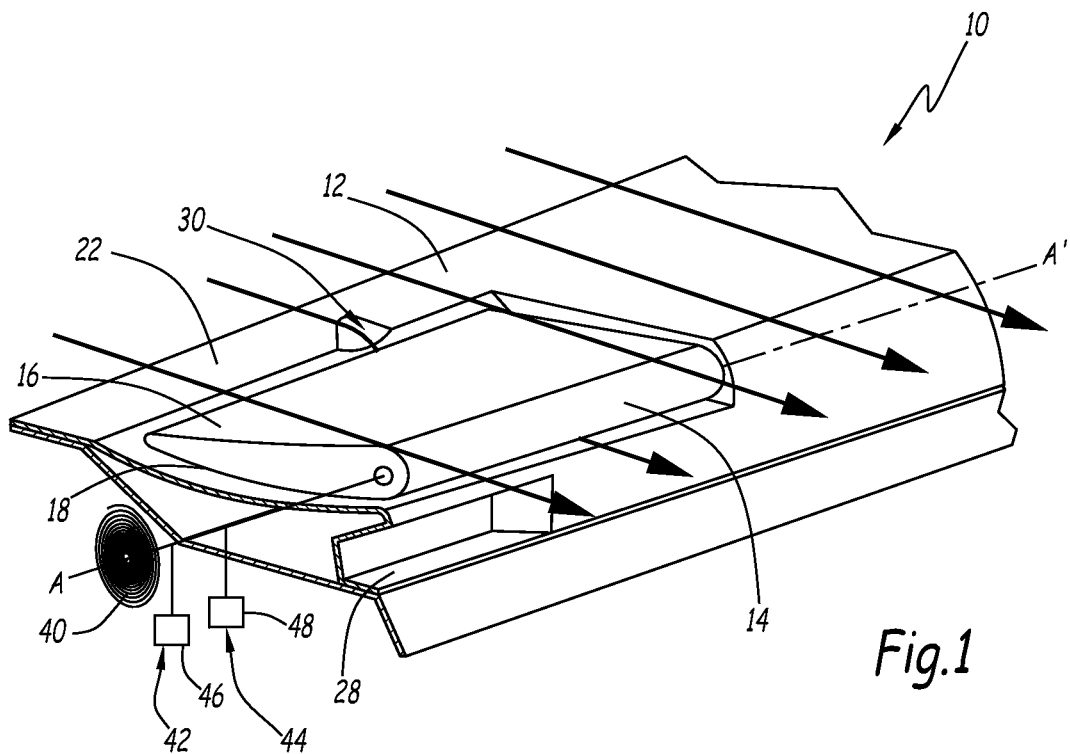
FIG. 1 is a perspective view of the air guiding device according to the invention, the moveable part being in the rest position.

FIG. 1 illustrates an air guiding device 10 for a motor vehicle. The air guiding device 10 comprises a fixed part 12 intended to be fastened to the motor vehicle, and at least one moveable part 14 assembled on the fixed part 12.

The fixed part 12 is for example fastened directly on the roof of the vehicle. In a variant, it is fastened on a liftgate.

The moveable part 14 is mounted rotating about a transverse axis A-A' relative to the fixed part 12 between a rest position and a deployed position.

The moveable part 14 comprises a first air guiding surface 16 and a second air guiding surface 18 that is substantially opposite the first air guiding surface 16. "Substantially" means that the second air guiding surface 18 extends completely opposite the first air guiding surface 16 or that it is slightly offset relative to the first air guiding surface 16 along the front-back direction.

When the moveable part 14 occupies the rest position, shown in FIG. 1, the first air guiding surface 16 guides the flow of air, the first air guiding surface 16 facing the outside of the motor vehicle, and the second air guiding surface 18 extending opposite the fixed part 12.

Advantageously, the guiding device 10 also includes a return spring 40 constraining the moveable part 14 toward the rest position, and a position blocking device 42 and/or a position unblocking device 44 for the moveable part 14.

The fixed part 12 comprises an air guiding surface 22 configured to guide the flow of air that flows around the fixed part 12, and a housing 26 configured to receive the moveable part 14 when the moveable part 14 is in the rest position. Advantageously, the fixed part 12 also comprises an additional housing 28 configured to receive a lighting device, for example a light of the center high mounted stop lamps (CHMSL) type.

The housing 26 has a shape substantially complementary to the moveable part 14 such that the moveable part 14 is able to be housed in the housing 26 without protruding substantially outside the gauge of the vehicle 10.

According to the embodiment shown in the figures, the additional housing 28 is arranged below the housing 26.

According to the embodiment shown in the figures, the moveable part 14 has a transverse length smaller than the length of the fixed part 12. In a variant, the guiding device 10 comprises several moveable parts 14 adjacent to one another along the transverse direction.

The rotation angle of the moveable part 14 between the rest position and the deployed position is greater than 30°, advantageously greater than 120°, and more advantageously substantially equal to 180°.

The rotation of the moveable part 14 from the rest position toward the deployed position is done under the effect of the flow of air around the motor vehicle, in particular under pressures generated by the flow of air. The moveable part 14 rotates from the deployed position toward the rest position when the speed of the motor vehicle is below a predetermined non-nil threshold.

According to one example, the moveable part 14 rotates from the rest position toward the deployed position when the speed of the motor vehicle is greater than 60 km/h, and the moveable part 14 rotates from the deployed position toward the rest position when the speed of the motor vehicle is less than 40 km/h.

Advantageously and in reference to FIG. 1, when the moveable part 14 is in the rest position, the first air guiding surface 16 extends substantially in the continuation of the air guiding surface 22 of the fixed part 12. "In the continuation" means that the first air guiding surface 16 and the air guiding surface 22 of the fixed part 12 together form a substantially continuous and regular air guiding surface. This configuration in particular makes it possible to preserve an interesting esthetic (for example makes it possible to eliminate play present on the air guiding device 10 and the flushness of the fixed part 12 relative to the moveable part 14), and to preserve good aerodynamic performance of the guiding device 10 when the moveable part 14 is in its rest position at a low speed, without being damaged by the presence of a surface protruding from the vehicle and increasing the drag of the vehicle at a low speed, or even to improve the performance of the guiding device 10 owing to the traditional air guiding area formed by the first guiding surface 16 of the moveable part 14.

Figure 2:
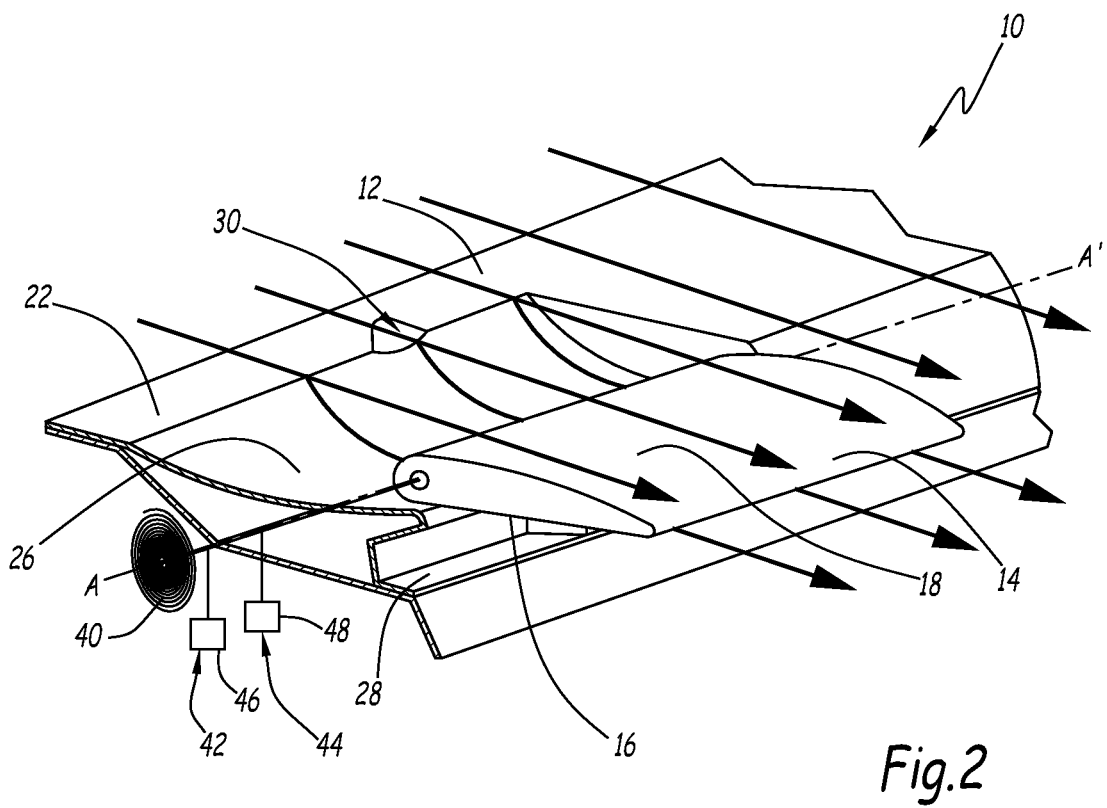
FIG. 2 is a view similar to FIG. 1, the moveable part being in the deployed position.

When the moveable part 14 is in the deployed position, shown in FIG. 2, the second air guiding surface 18 guides the flow of air, the first air guiding surface 16 extending toward the inside of the motor vehicle, and the second air guiding surface 18 extending toward the outside of the motor vehicle.

Furthermore, the deployed position of the moveable part 14 allows the elongation of the air guiding device 10, which improves its aerodynamic performance.

According to one embodiment of the invention, the first air guiding surface 16 has a substantially flat shape. In a variant, it has a convex or concave shape.

The second air guiding surface 18 has a profiled shape, allowing effective air guiding when the moveable part 14 occupies its deployed position. In a variant, the second air guiding surface 18 has a concave shape, or a convex shape. The shape of the second air guiding surface 18 is in particular arranged to improve the adherence, the stability, and the drag of the vehicle when it moves at a high speed.

According to the embodiment shown in the figures, the fixed part 12 and/or the moveable part 14 also comprise at least one additional air guide 30 configured to favor the flow of air below the moveable part 14 when the moveable part 14 is in its rest position, so as to favor the movement of the moveable part 14 between its rest position and its deployed position when the speed of the vehicle increases beyond a predefined threshold. Advantageously, the additional air guide 30 is also able to further improve the aerodynamic performance of the guiding device 10. The additional air guide 30 as for example a packing ring, a slot or an opening. It is for example arranged on the air guiding surface 22 of the fixed part 12, as shown in the figures. Other configurations of additional air guide(s) 30 are also possible.

Advantageously, the fixed part 12 and/or the moveable part 14 further comprises at least one stop (not shown in the figures) configured to reduce noise during the rotation of the moveable part 14.

According to one embodiment of the invention, this stop is integrated into the fixed part 12 and/or into the moveable part 14. In a variant, the stop is integrated into a rotation system of the moveable part 14 or into the position blocking device.

The position blocking device of the moveable part 14 is for example an actuator 46 able to convert the received energy into a physical phenomenon, for example a movement or a latch or any other simple mechanical system. The position unblocking device of the moveable part 14 is for example an impulse system 48, which makes it possible to reduce the electrical consumption during the unblocking of the moveable part 14.

Advantageously, the position blocking device is also able to keep the moveable part 14 in at least one intermediate position between the rest position and the deployed position. This allows the motor vehicle to adapt the position of the moveable part 14 in order to obtain a better aerodynamic performance as a function of the speed of the vehicle.

Thanks to the invention described above, the aerodynamic performance of the motor vehicle is improved at high movement speeds of the motor vehicle. Indeed, when the moveable part 14 is in the deployed position, the air guiding device 10 is elongated, which improves the aerodynamic performance of the motor vehicle at relatively high speeds.

The air guiding device proposed in the present invention improves the aerodynamic performance at high speeds by using very simple kinematics, while allowing satisfactory aesthetics when stopped or at low speeds by reducing the bulk of the air guiding device, which for example makes it possible to incorporate a brake light into the fixed part.

Furthermore, the design of the air guiding device 10 remains very simple, robust and reliable, and therefore has a reduced manufacturing cost.

The invention claimed is:

1. A motor vehicle comprising an air guiding device, the air guiding device comprising:
a fixed part fixed to the motor vehicle, and
at least one moveable part mounted on the fixed part, the moveable part being rotatable relative to the fixed part between a rest position and a deployed position, the moveable part comprising:
a first air guiding surface; and
a second air guiding surface, substantially opposite the first air guiding surface,
wherein the first air guiding surface guiding the flow of air when the moveable part is in the rest position,
wherein the second air guiding surface guiding the flow of air when the moveable part occupies the deployed position,
wherein the rotation of the moveable part from the rest position toward the deployed position is done under the effect of a flow of air around the motor vehicle when said motor vehicle moves, the moveable part rotating from the deployed position to the rest position when the speed of the motor vehicle is below a predetermined non-nil threshold,
wherein the fixed part comprises an air guiding surface and a housing complementary in shape to the second air guiding surface configured to receive the moveable part such that, when the moveable part is in the rest position, the first guiding surface of the moveable part extends substantially in the continuation of the air guiding surface of the fixed part.

2. The motor vehicle according to claim 1, wherein, when the moveable part occupies the rest position, the second air guiding surface extends opposite the fixed part and the first air guiding surface faces an outside of the motor vehicle, and when the moveable part occupies the deployed position, the second air guiding surface faces the outside of the motor vehicle.

3. The motor vehicle according to claim 1, wherein the rotation angle of the moveable part between the rest position and the deployed position is greater than 30°.

4. The motor vehicle according to claim 1, further comprising a return spring constraining the moveable part toward the rest position.

5. The motor vehicle according to claim 1, further comprising a position blocking device and/or a position unblocking device of the moveable part.

6. The motor vehicle according to claim 5, wherein the position blocking device is an actuator.

7. The motor vehicle according to claim 5, wherein the unblocking device is an impulse system.

8. The motor vehicle according to claim 1, wherein the moveable part rotates from the rest position toward the deployed position when the speed of the motor vehicle is greater than 60 km/h, and the moveable part rotates under spring force from the deployed position toward the rest position when the speed of the motor vehicle is less than 40 km/h.

9. The motor vehicle according to claim 1, wherein the housing has a shape substantially complementary to the moveable part such that the moveable part is able to be housed in the housing without protruding substantially outside a gauge of the motor vehicle.

* * * * *